United States Patent [19]

Rupert

[11] Patent Number: 4,846,343
[45] Date of Patent: Jul. 11, 1989

[54] PACKAGING FOR COILED FIBER OPTIC CABLE ASSEMBLIES

[75] Inventor: Martin R. Rupert, Hummelstown, Pa.

[73] Assignee: AMP Incorporated, Harrisburg, Pa.

[21] Appl. No.: 179,710

[22] Filed: Apr. 11, 1988

[51] Int. Cl.$^4$ .............................................. B65D 85/04
[52] U.S. Cl. ..................................... 206/303; 206/397; 206/408; 220/20.5; 242/96; 242/129; 350/96.2; 350/96.23
[58] Field of Search ......................... 206/389, 395–398, 206/408, 409, 310–312, 303; 242/85, 85.1, 55.53, 96, 129; 350/96.2, 96.23, 96.21; 220/20.5

[56] References Cited

U.S. PATENT DOCUMENTS

| | | | |
|---|---|---|---|
| 1,850,074 | 3/1932 | Crandall | 206/409 X |
| 2,576,335 | 11/1951 | Fanslow | 242/96 |
| 2,715,457 | 8/1955 | Voegeli | 206/389 |
| 2,753,042 | 7/1956 | Wellcome | 206/397 |
| 3,396,839 | 8/1968 | Shannon et al. | |
| 3,443,683 | 5/1969 | Felty et al. | |
| 3,590,481 | 7/1971 | Felty et al. | |
| 3,612,233 | 10/1971 | Nogpal et al. | 206/408 X |
| 3,982,712 | 9/1976 | Bassett | 206/395 X |
| 4,036,451 | 7/1977 | Pipkin | 206/389 X |
| 4,311,050 | 1/1982 | Bessman | 206/303 X |
| 4,410,084 | 10/1983 | Ladner | 206/408 X |
| 4,519,500 | 5/1985 | Perchale | 206/312 |
| 4,520,239 | 5/1985 | Schwartz | 242/96 X |
| 4,595,839 | 6/1986 | Braun et al. | 350/96.2 X |
| 4,623,062 | 11/1986 | Chase et al. | 206/311 |
| 4,623,063 | 11/1986 | Balkin | 206/397 X |
| 4,632,246 | 12/1986 | Brutosky . | |
| 4,657,140 | 4/1987 | Zagar et al. | 206/397 |
| 4,676,446 | 6/1987 | Ciocarelli | 242/55.53 |
| 4,702,551 | 10/1987 | Coulonbe | 350/96.2 |

FOREIGN PATENT DOCUMENTS 675639 2/1930 France .................. 206/303

Primary Examiner—Bryon P. Gehman

[57] ABSTRACT

A container for storing a coiled fiber optic cable having at least one connector at its end comprises a base and an openable lid on the base. The base and lid from a first arcuate compartment for receiving the windings of the coiled fiber optic cable, and a second compartment separated from the first compartment for receiving the connector. The base and lid are releasably secured to each other by edge portions which meet in a press-fit relationship. Desirably, the base and lid are formed from a clear polyvinyl chloride material in the manner of a blister package.

8 Claims, 4 Drawing Sheets

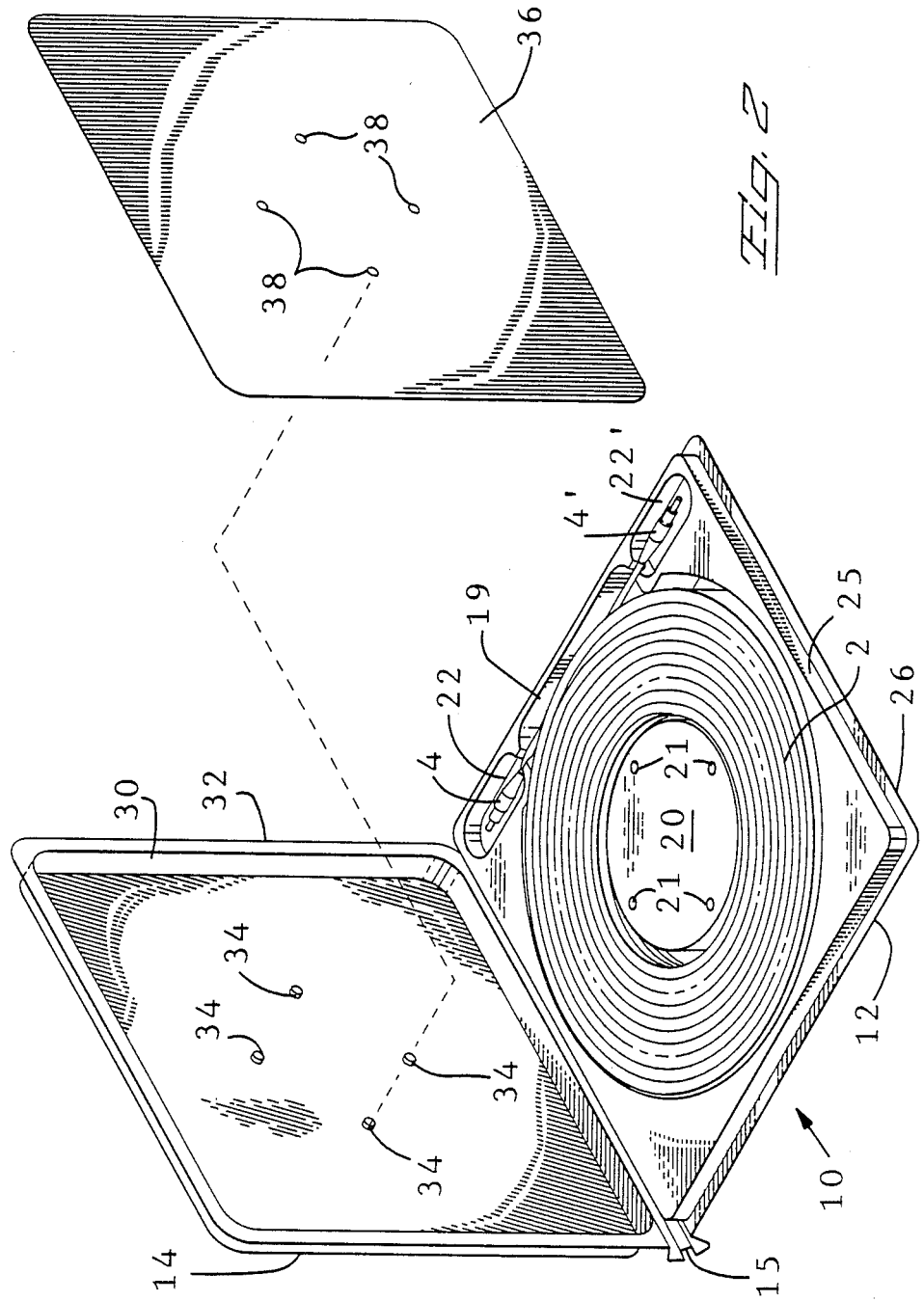

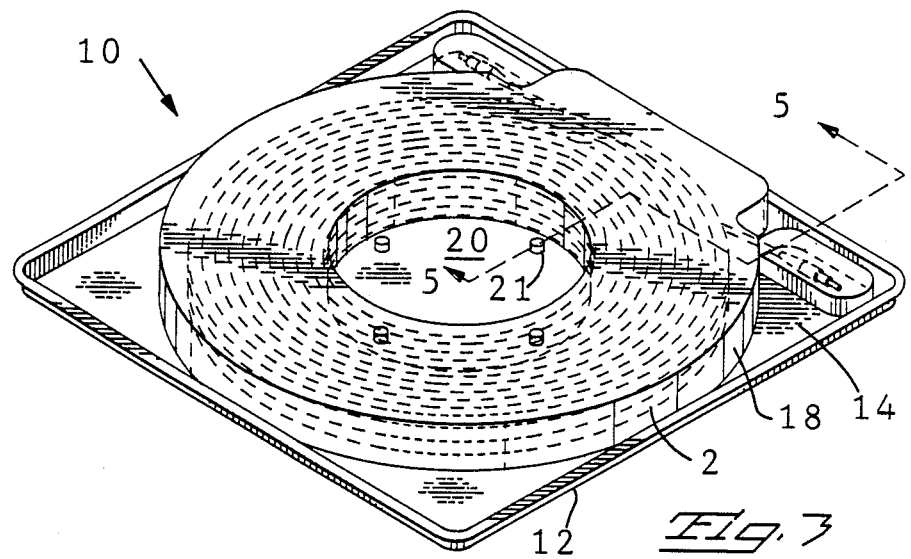
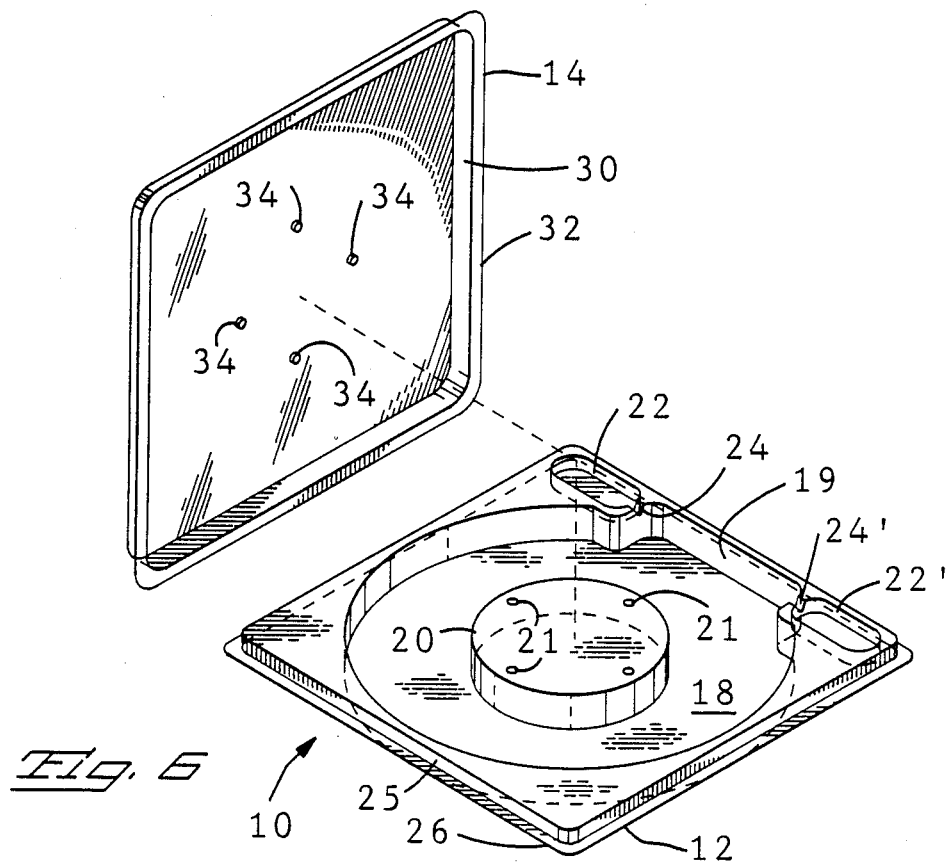

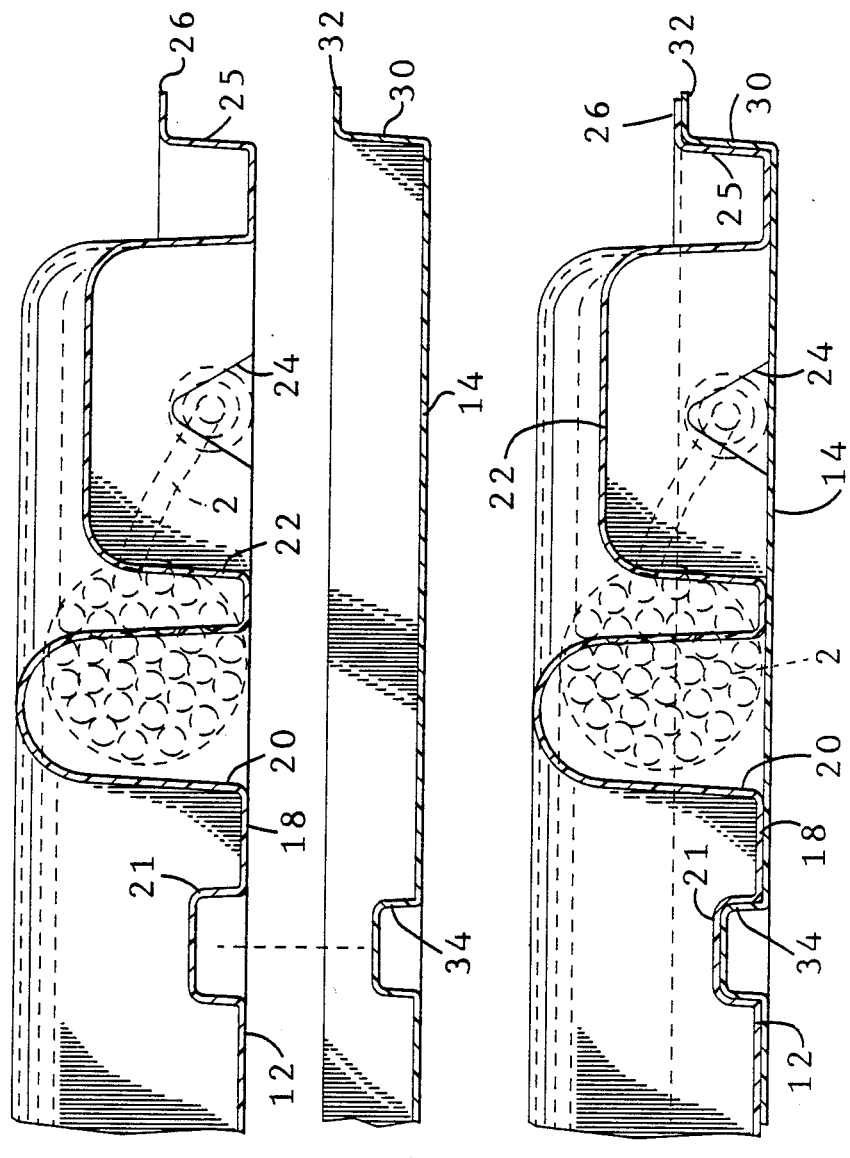

PACKAGING FOR COILED FIBER OPTIC CABLE ASSEMBLIES

FIELD OF THE INVENTION

The invention relates to packaging for storing a coiled fiber optic cable assembly. More particularly, the invention relates to packaging having a first major compartment for receiving the windings of a coiled fiber optic cable assembly and separate compartments for receiving the connectors at the ends of the fiber optic cable assembly.

BACKGROUND OF THE INVENTION

In recent years, electro-optical equipment is increasingly replacing electronic equipment for certain applications, for example, in telecommunications networks. This trend is expected to continue because of the inherent advantages that electro-optical equipment has over electronic equipment for these applications. In order to interconnect various pieces of electro-optical equipment, fiber optic cables are used. The fiber optic cables comprise an optical fiber surrounded by shielding with connectors at the ends thereof. In appearance, the fiber optic cables resemble electric shielded cables, such as coaxial cables. The fiber optic cables are often 5 to 200 meters in length. Different kinds of connectors, for example, simplex or duplex connectors, may be attached to the ends of the fiber optic cables.

Heretofore, such fiber optic cables have been stored by winding them into coils and placing them in plastic bags. However, plastic bags are not entirely satisfactory for storing fiber optic cables. The plastic bags, because of their thinness and suppleness, offer little or no protection for the fiber optic cables. The plastic bags also do not offer any simple means of uniform stacking. As a result, the fiber optic cables tend to be heaped in a mass. This makes it difficult to identify and remove a specific fiber optic cable, such as a fiber optic cable of a specific length or having a certain kind of connector from the mass of other fiber optic cables. Moreover, when stored in plastic bags, the connectors, often made of metal, can rub against each other and against the shielding of the fiber optic cables. Thus, the plastic bags do not offer any protection from the connectors themselves.

Accordingly, there is a need for special packaging adapted for storing a fiber optic cable which provides protection for the cable from external sources. In addition, there is a need for a fiber optic cable package which prevents the connectors from rubbing against each other and from rubbing against the shielding of the cables. There is a further need for a fiber optic cable package which is easy to stack and provides ready identification of the fiber optic cable stored inside.

SUMMARY OF THE INVENTION

The invention provides a container for receiving a coiled fiber optic cable having at least one connector at an end thereof. The inventive container comprises a base and an openable lid releasably secured to the base. The base and openable lid form a first arcuate compartment for receiving the windings of the coiled fiber optic cable therein. The base and openable lid also form at least one second compartment for receiving the connector in the second compartment. The second compartment is separated from the first arcuate compartment so that the connector is kept isolated from the windings of the fiber optic cable. The base and the lid each have peripheral edge portions which meet in an interference fit or press fit relationship. In this manner, the lid is releasably secured to the base.

An aspect of the present invention is that the base and the lid are made from a rigid, transparent material in the manner of a blister package. The rigidity of the package thereby provides protection for the fiber optic cable. It also enables one to stack neatly a variety of packages atop one another. The transparency of the material enables one to identify readily the kind of cable stored inside.

Other advantages and aspects of the invention will be apparent from the following detailed description by way of example of the invention and from the accompanying drawings.

DESCRIPTION OF THE DRAWINGS

FIG. 2 is a perspective view showing a fiber optic cable in the container with the container open.

FIG. 3 is a perspective view showing a fiber optic cable stored in a closed container.

FIG. 4 is an enlarged cross-sectional view showing the lid and base of the container separated from each other.

FIG. 5 is an enlarged cross-sectional view taken along line 5—5 of FIG. 3.

FIG. 6 is perspective view of a second embodiment of the container.

With more particular reference to the drawings, FIGS. 1–5 show a fiber optic cable 2 and a container 10 for receiving fiber optic cable 2. Fiber optic cable 2 has been wound into a coil and has at its ends connectors 4 and 4'. Connectors 4, 4' are made substantially from metal and in the illustrated embodiment comprise simplex connectors. Fiber optic cable 2 has been wound into a coil with aluminum radius of curvature for the windings of about 4 inches. It is important that this minimum radius of curvature be maintained because too tight a coil could cause damage to the optical fiber within cable 2.

Figure 1:
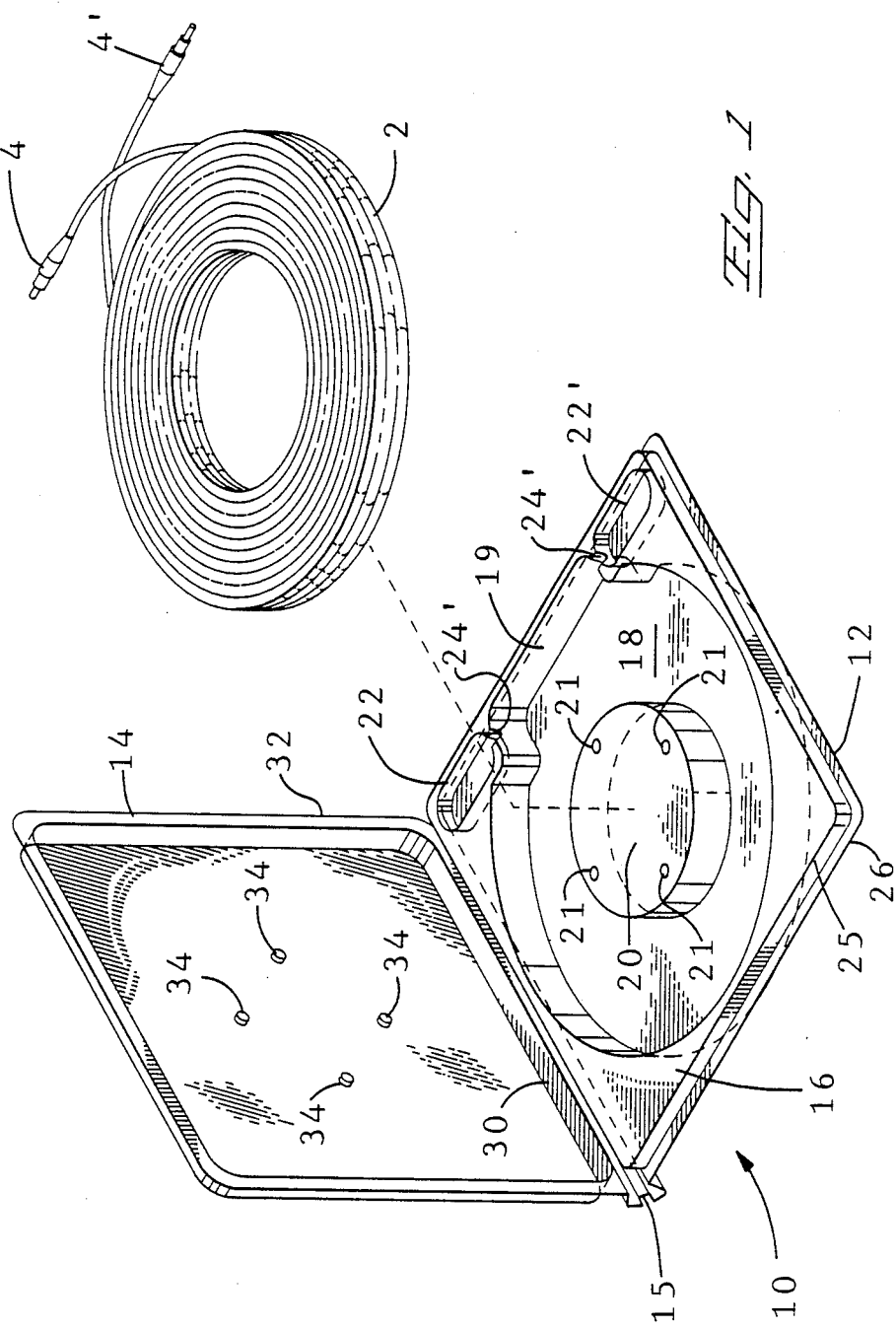
FIG. 1 is a perspective view of a fiber optic cable and a container therefor.

Container 10 is substantially rectangular in shape and comprises a base 12 and an openable lid 14. Base 12 and lid 14 are made from a rigid, transparent material such as polyvinyl chloride in the manner of a blister package. Base 12 and lid 14 are hinged together by means of hinge 15.

Base 12 and lid 14 are made with a number of elevations and depressions which form the various compartments and components of container 10. Base 12 is formed with a substantially flat raised platform 16. A major depression in platform 16 forms a first substantially circular compartment 18 with a flattened side 19 which is adapted to receive the coiled fiber optic cable 2 therein as shown in FIG. 2. The coiled fiber optic cable 2 is wound about a circular raised portion 20 in the center of compartment 18. Raised portion 20 defines the minimum radius of curvature for coiled fiber optic cable 2. Four minor depressions 21, the purpose of which will be explained hereinbelow, are provided in raised portion 20. Minor depressions 21 are symmetrically spaced about raised portion 20.

Base 12 further includes minor depressions in platform 16 which form compartments 22, 22' at one side of base 12. Compartments 22, 22' are smaller than compartment 18 and are adapted for receiving connectors 4, 4' as best seen in FIG. 2. Channels 24, 24' lead from compartment 18 into the respective compartments 22, 22'. Channels 24, 24' are not as deep as compartments 18, 22, and 22'.

Base 12 further includes an edge portion 25 which extends downwardly from platform 16 and runs about the periphery of base 12. The depth of edge portion 25 is approximately equal to the depth of channels 24. 24'. A flange 26 extends outwardly from edge portion 25.

Lid 14 is a substantially flat member which is hinged to base 12 by means of hinge 15. Lid 14 includes a vertical edge portion 30 and an outwardly extending flange 32 both of which are similar to edge portion 25 and flange 26 of base 12. Edge portion 30 is of only slightly larger dimension than edge portion 25 so that when lid 14 is swung forwardly about hinge 25, the two edge portions meet in a press fit as shown in FIG. 5. At the same time, flange 32 of lid 14 registers with flange 26 of base 12. The press fit between edge portions 25 and 30 keeps lid 14 secured to base 12 unless a positive force is exerted to separate lid 14 from base 12.

Lid 14 further includes projections 34 which are designed to mate with the minor depression 21 of raised portion 20. The fit between projections 34 and depressions 21 is also a press fit so as to enhance the mating relationship between lid 14 and base 12.

A logo board 36 shown in FIG. 2 is also provided. Logo board 36 is sized to fit snugly within the outer edge portion 30 of lid 14. Logo board 36 includes apertures 38 designed to fit over projections 34 so that logo board 36 will lay flt against lid 14. The logo board 36 is oriented so that it will be easily seen through the clear material of lid 14 and base 12. The logo board contains markings to identify the manufacturer and the kind of optical fiber cable within container 10. Logo board 36 may also contain a graphics design to give the product a "high tech" look.

The packaging is assembled by laying the windings of optical fiber cable 2 in compartment 18 of base 12. Each end of cable 2 is then led through one of channels 24, 24' so as to place connectors 4, 4' in compartments 22, 22'. Lid 14, with or without logo board 36, is then swung forward so as to press fit the base 12 and lid 14 together. Thereafter, the containers 10 may be stacked atop one another with either the base 12 or lid 14 on bottom. Desirably, logo board 36 should be oriented so that its markings are visible from above.

Referring now to FIG. 6, a seocnd embodiment of the invention is provided. In the embodiment illustrated in FIG. 6, there is no hinge between lid 14 and base 12. Instead, the interference fit between edge portion 25 of base 12 and edge port 30 of lid 14 runs about the entire periphery of container 10. In other respects, container 10 of FIG. 6 is similar to that of container 10 except that it is adapted to receive a fiber optic cable of much longer length than is container 10.

The aspects of the invention have been described and illustrated only by way of example and may be embodied in further examples intended to be in and of the spirit and scope of the claims.

I claim:

1. A package for a coiled fiber optic cable connected to at least one corresponding optical connector, wherein the improvement comprises in combination;
   a base and a lid covering the base and enclosing the coiled after optic cable,
   the base including a first depression therein covered by the lid and defining a first compartment for the coiled fiber optic cable, and including a raised portion thereof around which the fiber optic cable is coiled, said raised portion defining a minimum radius of curvature around which the fiber optic cable is coiled said minimum radius of curvature preventing damage to the fiber optic cable by tighter coiling of the coiled fiber optic cable, and
   the base including a second depression therein covered by the lid the second depression being enclosed by the lid and the base and in communication with the first compartment through an outer wall of the first compartment, the seocnd depression defining a second compartment for a corresponding optical connector connected to a portion of the fiber optic cable extending through the outer wall of the first compartment.

2. A package as recited in claim 1, wherein the improvement further comprises in combination; the base including a third depression therein covered by the lid the third depression being enclosed by the lid and the base and in communication with the first compartment through the outer wall of the first compartment, the third depression defining a third compartment for another corresponding optical connector connected to a corresponding portion of the fiber optic cable extending through the outer wall of the first compartment.

3. A package as recited in claim 2, wherein the improvement further comprises in combination; the outer wall of the first compartment having a flattened portion, and the second and third depressions being opposite each other and communicating with the first compartment along the flattened portion.

4. A package as recited in claim 12, wherein the improvement further comprises in combination; the outer wall of the first compartment having a flattened portion, and the second depression communicating with the first compartment along the flattened portion.

5. A package as recited in claim 1, wherein the improvement further comprises in combination; multiple depressions in the raised portion, and multiple raised projections on the lid press fit in the multiple depressions.

6. A package as recited in claim 5, wherein the improvement further comprises in combination; a logo board within the confines of the lid and provided with multiple apertures fitting over the multiple projections on the lid.

7. A package as recited in claim 1, wherein the improvement further comprises in combination; the lid is hinged to the base.

8. A package as recited in claim 1, wherein the improvement further comprises in combination; corresponding edge portions along the base and along the lid meeting together in a press fit with each other when the raised portion of the base is covered by the lid.

* * * * *

UNITED STATES PATENT OFFICE
CERTIFICATE OF CORRECTION

Patent No. 4,846,343          Dated July 11, 1989

Inventor(s) Martin R. Rupert

It is certified that error appears in the above-identified patent and that said Letters Patent is hereby corrected as shown below:

In column 4, line 40, claim 4, change "claim 12" to --claim 2--.

Signed and Sealed this

Twenty-ninth Day of May, 1990

*Attest:*

HARRY F. MANBECK, JR.

*Attesting Officer*          *Commissioner of Patents and Trademarks*